(12) United States Patent
Coulthard et al.

(10) Patent No.: US 7,904,803 B2
(45) Date of Patent: Mar. 8, 2011

(54) METHOD AND SYSTEM FOR CONVERTING USER INTERFACE SOURCE CODE OF A LEGACY APPLICATION TO WEB PAGES

(75) Inventors: Philip S. Coulthard, Aurora (CA); Michael A. Hockings, Goodwood (CA); Edmund Horst Reinhardt, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 2238 days.

(21) Appl. No.: 09/879,024

(22) Filed: Jun. 11, 2001

(65) Prior Publication Data

US 2002/0178290 A1    Nov. 28, 2002

(30) Foreign Application Priority Data

May 25, 2001  (CA) .................................... 2348706

(51) Int. Cl.
*G06N 3/00* (2006.01)
(52) U.S. Cl. ....................................................... 715/234
(58) Field of Classification Search .................. 715/517, 715/513, 501.1, 500.1, 514, 523, 530, 234, 715/243, 254; 707/2
See application file for complete search history.

(56) References Cited

U.S. PATENT DOCUMENTS

| | | | | |
|---|---|---|---|---|
| 5,892,905 | A | 4/1999 | Brandt et al. | 395/187.01 |
| 5,956,487 | A | 9/1999 | Venkatraman et al. | 395/200.48 |
| 5,970,490 | A | 10/1999 | Morgenstern | |
| 5,974,430 | A | 10/1999 | Mutschler, III et al. | 707/505 |
| 6,029,238 | A | 2/2000 | Furukawa | 712/1 |
| 6,092,078 | A | 7/2000 | Adolfsson | 707/102 |
| 6,133,916 | A | 10/2000 | Bukszar et al. | 345/335 |
| 6,163,794 | A | 12/2000 | Lange et al. | 709/202 |
| 6,170,007 | B1 | 1/2001 | Venkatraman et al. | 709/218 |
| 6,336,124 | B1 * | 1/2002 | Alam et al. | 715/523 |

(Continued)

FOREIGN PATENT DOCUMENTS

CA        2219624        4/1999

(Continued)

*Primary Examiner* — Kyle R Stork
(74) *Attorney, Agent, or Firm* — Sawyer Law Group, P.C.

(57) ABSTRACT

A method and apparatus that has the ability to convert display pages of interactive legacy applications for use on a network, such as the Internet. The display source code of the legacy application is first parsed into a network-based language, such as XML, preserving the structure and hierarchy of the display source to create a plurality of network user interface pages. The network user interface pages are then converted to a dynamic platform-independent language in which the static portion of the display page is converted to a web page, such as a JavaServer Page, and the dynamic portion of the display page for input/output/feedback is converted to data objects, such as JavaBeans. The intermediate network user interface pages may be stored on the server with the legacy application. The conversion program to convert the intermediate network user interface pages may be stored on a computer program product, a client connected to the server with the legacy application, or the server itself. The method of this invention provides an environment such that when an application is invoked from a client, the runtime data manager may use either the traditional display source code or the generated intermediate network user interface pages as its user interfaces. Thus, the legacy application's data stream need not be redirected but is already in the format accessible to the network server across the network to the network user agent as network pages, such as JavaServer Pages with the dynamic input/output/feedback data as JavaBeans.

16 Claims, 4 Drawing Sheets

U.S. PATENT DOCUMENTS

| | | | |
|---|---|---|---|
| 6,473,794 B1 * | 10/2002 | Guheen et al. | 709/223 |
| 6,721,713 B1 * | 4/2004 | Guheen et al. | 705/1 |
| 6,732,331 B1 * | 5/2004 | Alexander | 715/513 |
| 2002/0120787 A1 * | 8/2002 | Shapiro et al. | 709/311 |
| 2002/0162093 A1 * | 10/2002 | Zhou et al. | 717/130 |
| 2004/0015839 A1 * | 1/2004 | Sarkar et al. | 717/108 |

FOREIGN PATENT DOCUMENTS

| | | |
|---|---|---|
| EP | 1 031 922 A2 | 8/2000 |
| JP | 10 69376 | 3/1998 |
| WO | WO9956243 | 11/1999 |
| WO | WO0050844 | 8/2000 |
| WO | WO 01/33387 A2 | 5/2001 |

* cited by examiner

METHOD AND SYSTEM FOR CONVERTING USER INTERFACE SOURCE CODE OF A LEGACY APPLICATION TO WEB PAGES

FIELD OF THE INVENTION

The present invention relates generally to the field of computer software applications and more particularly relates to converting source code of user interface display files of legacy application programs to web pages, such as JavaServer Pages, during development.

BACKGROUND OF THE INVENTION

Like everything else, computer use has changed over the years. In the early days, large mainframe computers dominated the industry until the advent of the personal stand-alone computer. Now many businesses and homes have at least one personal stand-alone computer, a PC. A new paradigm of computing, however, has emerged: network-centric computing or distributed computing in which at least two, but more likely many more computers, called clients and servers, are interconnected through a network wherein the software applications used by a client resides on a server. Thus, a server may provide the application or client program or databases used by an end user or by a number of other servers and clients over a network. In many instances and increasingly more so, the network connecting clients and servers is the Internet. The Internet refers to a collection of interconnected computer networks that use the Internet protocol, e.g., TCP/IP, UDP, etc. The world wide web refers to a software management scheme which accesses the Internet with various user agents using hypertext links.

Distributed computing has fundamentally changed the methodology of software developers in writing code for these applications. Rather than writing one massive self-contained application having thousands or millions of lines of code, software developers now select and weave together smaller portions of code, called components, each associated with a particular function that can be reused across multiple applications, all on the world wide web. Current industry architectures for Internet and world wide web applications, moreover, require that business or application logic be separated from presentation logic such that the business logic is solely responsible for providing business data while the presentation logic is solely responsible for driving presentation or the user interface.

Software applications, moreover, are written in programming languages that are independent of the operating system of either the server or the client to access and use a myriad of applications on the Internet. Languages that describe data over the Internet, moreover, include variations of extensible mark-up languages (XML), such as hypertext mark-up language (HTML), wireless mark-up language (WML), etc. JAVA™ is a programming language developed by Sun Microsystems that has blossomed and thrived in the mid to late 1990s coincident with the burgeoning expansion of network computer technology and the world wide web browser technology on the Internet, in part because Java is independent of the operating system of a computer. Java applications can be written on one computer and transferred over a network, such as the Internet, to any processing device having a Java virtual machine regardless of the hardware or software in the receiving machine, consistent with the Write Once, Run Anywhere philosophy of Java software development. Thus, Java applications can be written on one server and then transferred over the web to multiple clients/servers.

A tutorial in definitions as used herein may be helpful. An application or a client program is a software program used by an end user. For instance, a person entering data to schedule employees' work days may be using a scheduling client program or application. A person writing a paper may be using a word processing application. A person creating a visual demonstration may be using a presentation application. A tool is a software application environment that enables a software developer to write further applications in a particular computer environment. IBM's VisualAge, Visual J++, Lotus Bean Machine, Semantic Café, etc. are all tools that allow a programmer to write Java applications. A component is software code that can be reused across multiple applications; in other words, a component is standard software that can be pulled off a server and incorporated into new applications using a tool by software developers. For example, a calendar component may be used in several applications such as a scheduling application, a presentation application, a data base application to calculate employee's vacation and pay, etc. Thus, a software developer using tools to write an application can pull a calendar component off the server for insertion into the application.

A JavaBean is a particular kind of component that can be visually manipulated in a tool and meets a standard protocol of Sun Microsystems for the Java programming language. An Enterprise JavaBean (EJB) is a reusable development component in a client/server environment. The current Enterprise JavaBean specification from Sun Microsystems is a programming model for server side components in Java with support for transactions and security.

The massive self-contained legacy applications having thousands or millions of lines of code, however, may still be very important to businesses and organizations. Indeed, some self-contained programs may contain a business's entire inventory/client list/database or all of the above. The term "legacy applications" refers to existing applications which remain in operation with a business or organization but were developed before the advent of distributed computing and structured programming and its techniques of modularity, coupling, cohesion, etc. Legacy applications written as one large self-contained program do not accommodate change easily. These legacy applications, moreover, are often so critical to the business that these businesses face difficult decisions about the future of such applications and the ability to exploit new network and Internet technologies for remote and distributed access to these critical applications. Interactive legacy applications that have mixed business and presentation logic must be restructured and/or reengineered to be enabled as web applications. Separating the business logic from the user interface logic, however, is not always practicable to deploy applications onto the web with minimal intervention and testing. Some legacy applications, moreover, have thousands of different user interface screens. Such an effort to convert the user interface display files to existing web pages would take extraordinary effort and time.

Other solutions to implement legacy applications, and particularly to display files and user interfaces on the Internet may use a screen-scraping technique which converts legacy display data streams at runtime or "on the fly" to a web-based language, such as HTML, or other language. The HTML converted screens are then displayed on a browser. This technique involves converting the datastream as it is being written to the device. When the application logic writes a record format during runtime, the work station data manager creates a legacy datastream. The dynamic data from the application is merged with the compiled display file object on disk and the result is a legacy application data stream containing all the attributes, static text and dynamic data for that record format. The normalized legacy application datastream is intercepted and converted just prior to displaying it on the end user's workstation or Web browser.

Converting the legacy display datastream at runtime, however, is slow and significantly compromises performance of the application. Such conversion, moreover, does not give the user the capability of integrating or changing the user interface according the needs of the customers or to seamlessly weave the legacy application display files with new web or other network applications. Quite simply, mere conversion of legacy datastream display files does not provide the capability to enhance the effectiveness of the user interface of the application when the application runs on the Internet.

There is thus a need in the industry to convert display pages from existing legacy applications to dynamic modern Web browser user interfaces during development so that the legacy applications can be accessed on the Internet or other computer communication networks without having to create an alternative web browser user interface for the existing application and without having to manually create every single web page from scratch, trying carefully to maintain the functionality of the original display file user interface.

Java™ is a trademark of Sun Microsystems, Inc., Windows™ is a trademark of Microsoft, Inc. and Zseries™, Xseries™, Pseries™, Iseries™, AS/400™, WebSphere Studio, and WebFacing Tool™ are trademarks of IBM. When used throughout the patent, the trademark will be designated as having an initial capital letter.

SUMMARY OF THE INVENTION

These needs and others that will become apparent to one skilled in the art are satisfied by a method to convert display source code of a legacy application on a server to a network interactive web-browser page, the method comprising the steps of: resolving the display source code of the legacy application into a plurality of record formats and for each of the plurality of record formats, resolving a plurality of references within the record format to database files; determining the hierarchy and relationships of the plurality of references; parsing the plurality of references to an web-language file using nested tags to capture the hierarchy and relationship of the plurality of references to create network user interface pages; converting the network user interface pages to an object-oriented platform-independent network language by creating dynamic components for input, output, and feedback references and creating a static component for unchanging references of each record format.

The network interactive web-browser page may be displayed on the Internet, and/or it may be displayed on a network selected from the group consisting of: an internal network, an Intranet, a LAN, a WAN, an internal bus, a wireless network. The web-language file may be an XML language file, and more specifically, may be an HTML file and/or a WML file.

Preferably, the static component is a JavaServer Page and the dynamic components may comprise JavaBeans. The user interface pages may be stored on the server with the legacy application such that the data stream of the legacy application is directed to the user interface pages rather than the display source code.

It is further envisioned that an embodiment of the invention comprises a plurality of network interactive web-browser pages created by the method above.

Another embodiment of the invention may further be considered a program product for use in a computer network for creating web interfaces of a legacy application stored on a computer, the computer program product comprising a signal-bearing medium carrying thereon: a parser of display file data description source of the legacy application to render the source into a plurality of network user interface pages, each network user interface page to display a record format of the legacy application; a converter of the network user interface page wherein at least one data object maintains the application's input/output/feedback data on a client and at least one web-browser page maintains the application's static content; a servlet instance to dynamically update the web-browser page with the application's input/output/feedback data; and a network user agent to display the web-browser page on a client.

Another embodiment of the invention also encompasses a program product for use in a computer network, the computer program product comprising a signal-bearing medium carrying thereon a plurality of network user interface pages of format records of display source code of a legacy application; the network user interface pages to receive data from the legacy application and in response thereto, the network user interface pages are converted to web-browser pages, a static portion of which displays the static portion of the format record and a dynamic portion of which interacts with the web-browser page to display input/output/feedback data required by/from/of the legacy application.

Another embodiment of the invention is also a computer system for executing an application, comprising: a central processing unit; a main memory connected to the central processing unit with a communication bus; a data storage unit connected to a data storage interface which is connected to said communication bus; at least one input/output device connected to said communication bus and connected to a network interface to an external computer network, an application stored in said main memory and capable of executing on said central processing unit; a plurality of intermediate network user interface pages, each of which correspond to a record format of the application, wherein as the application executes, the application logic may use either a traditional display of the record format or the plurality of intermediate network user interfaces pages for communication of the application to a user over the external computer network.

Yet, another embodiment of the invention may further be considered a computer server for converting the display source of an application stored and executing on a computer, comprising: a central processing unit; a parser to parse the display source into a plurality of record formats; each of the record formats unique to each input/output screen definition of the application; a generator of web-language user interface files having nested tags of each of the record formats; a converter of web-language user interface files further comprising an object creator to create dynamic components for the dynamic portions of the display source and a static component for display of the unchanging aspects of the record formats.

DETAILED DESCRIPTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
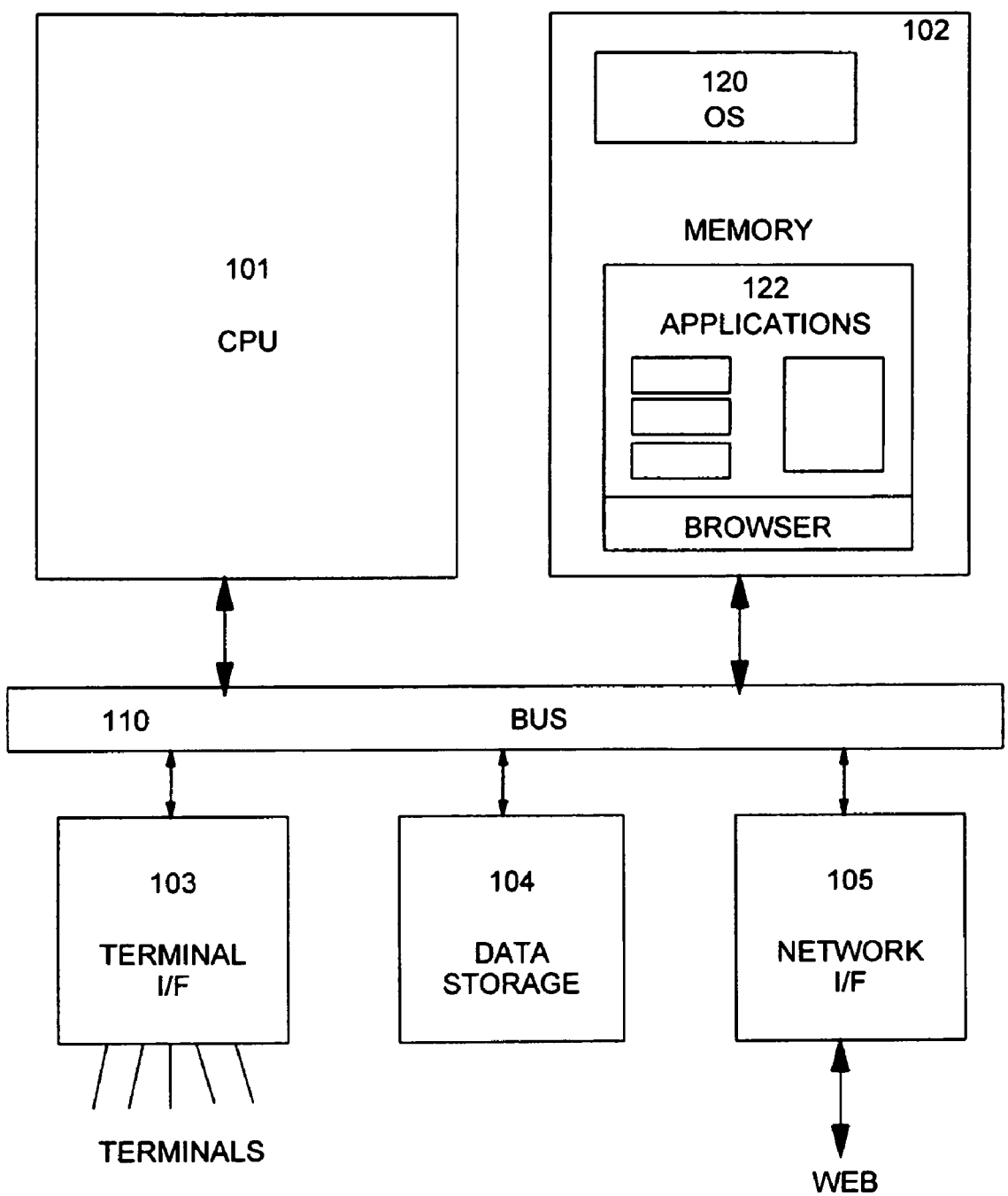
FIG. 1 is a high-level block diagram of a computer system capable of implementing the preferred embodiment of the invention.

Referring to the Drawing, wherein like numbers denote like parts throughout the several views, FIG. 1 shows a high-level block diagram of a computer system 100, consistent with an embodiment of the invention. Computer system 100 may comprise central processing unit (CPU) 101, main memory 102, terminal interface 103, data storage 104, and a network, e.g., Internet, interface 105. The various devices communicate with each other via internal communications bus 110. CPU 101 is a general-purpose programmable processor, executing instructions stored in memory 102; while a single CPU is shown in FIG. 1, it should be understood that computer systems having multiple CPUs could be used. Memory 102 is a random-access semiconductor memory for storing data and programs; memory is shown conceptually as a single monolithic entity but it is well known that memory is often arranged in a hierarchy of caches and other memory devices. Operating system 120 and applications 122 reside in memory 102. Operating system 120 provides, inter alia, functions such as device interfaces, management of memory pages, management of multiple tasks, etc. as is known in the art. Examples of such operating systems may include UNIX, WINDOWS-based, OS/400, etc. Applications 122 may include legacy applications and if it includes a server software application, network interface 105 may interact with the server software application to enable computer system 100 to be a network server.

Terminal interface 103 may support the attachment of single or multiple terminals and may be implemented as one or multiple electronic circuit cards or other units. Data storage 104 preferably comprises one or more rotating magnetic hard disk drive units, although other types of data storage could be used. Network interface 105 provides a physical connection for transmission of data to and from a network. In the preferred embodiment the network is the Internet but the network could also be any smaller self-contained network such as an Intranet, a WAN, a LAN, or other internal or external network using, e.g., telephone transmissions lines, satellites, fiber optics, T1 lines, etc. and any various available technologies. Communications bus 110 supports transfer of data, commands and other information between different devices; while shown in simplified form as a single bus, it is typically structured as multiple buses; and may be arranged in a hierarchical form.

The computer system shown in FIG. 1 is intended to be a simplified representation, it being understood that many variations in system configuration are possible in addition to those specifically mentioned here. While system 100 could conceivably be a personal computer system, the computer 100 may also be a larger computer system such as a Zseries, an Xseries, an iSeries, or a pSeries server from IBM or a similar computer server manufactured by other companies. While a particular hardware configuration is described herein along with various alternatives, the methods described could in general be practiced using any hardware configuration that allows access to legacy applications across a computer network from a client. CPU 101 is suitably programmed to carry out the preferred embodiment by having the legacy application and a network interface that can be used by other connected computers to access that legacy application.

Computer system 100 and its components are shown and described in FIG. 1 as a more or less single, self-contained computer system. It is alternatively possible to use multiple computer systems, particularly multiple systems which share a single large database, each having a specialized task. For example, one or more computer systems 100 could be dedicated to one or more legacy applications accessing a database, while one or more other computer systems 100 could be dedicated to servicing requests received from clients or accessing the Internet. References herein to a computer should be understood to include either a single computer or a collection of computer systems which provides access to a legacy application and to a network by which to connect to a client system.

Figure 2:
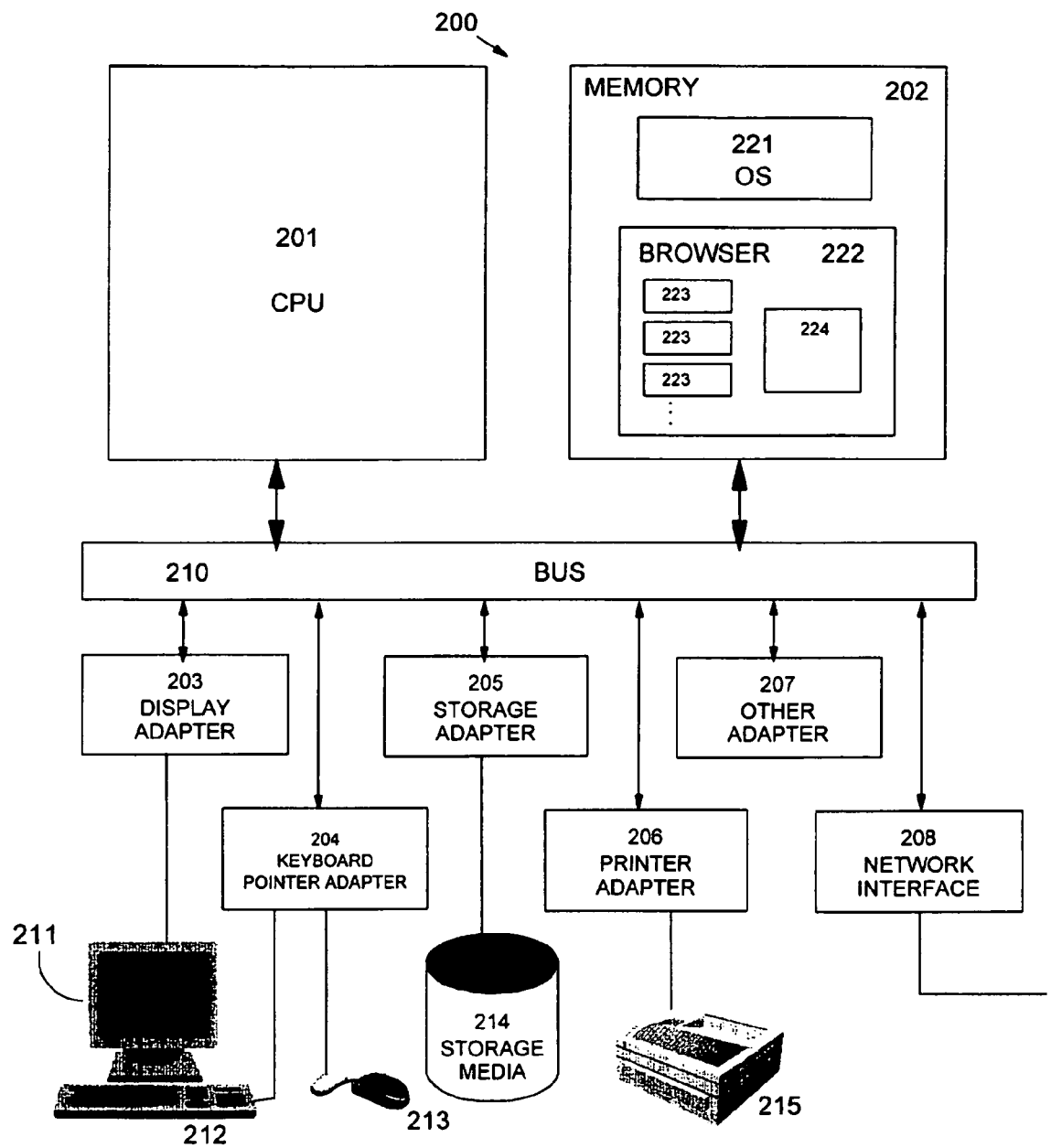
FIG. 2 is a simplified block diagram of a server system which may access legacy applications stored on the computer system in accordance with principles of the preferred embodiment of the invention.

FIG. 2 is an example of a network server 200 which may access a legacy application stored on the computer 100. Network server 200 may be a computer system including a CPU 201, main memory 202, various device adapters and interfaces 203-208, and communications bus 210. CPU 201 is a general-purpose programmable processor, executing instructions stored in memory 202; while a single CPU is shown in FIG. 2, it should be understood that computer systems having multiple CPUs could be used. Memory 202 is a random-access semiconductor memory for storing data and programs; memory is shown conceptually as a single monolithic entity, it being understood that memory 202 is often arranged in a hierarchy of caches and other memory devices. Communication bus 210 supports transfer of data, commands and other information between different devices; while shown in simplified form as a single bus, it may be structured as multiple buses, and may be arranged in a hierarchical form. Display adapter 203 supports video display 211, which may be a cathode-ray tube display, a flat panel display, or a touch panel, although other display technologies may be used. Keyboard/pointer adapter 204 supports keyboard 212 and pointing device 213, depicted as a mouse, it being understood that other forms of input devices could be used. Storage adapter 205 supports one or more data storage devices 214, which may be rotating magnetic hard disk drives or CD-ROM drives, although other data storage devices could be used. Printer adapter 206 supports printer 215. Adapter 207 may support any of a variety of additional devices, such as audio devices, etc. Network interface 208 provides a physical interface to a network, such as the Internet. This interface may comprise a modem connected to a telephone line through which an Internet access provider or on-line service provider is reached, but increasingly other higher bandwidth interfaces are implemented. For example, network server 200 may be connected to another network server via a local area network using an Ethernet, Token Ring, or other protocol, the second network server in turn being connected to the Internet. Alternatively, network interface 208 may be provided through cable television, fiber optics, satellites, wireless, or other connections. The representation of FIG. 2 is intended as an exemplary simplified representation of a high-end server, it being understood that in other network servers 200 many variations in system configuration are possible in addition to those mentioned here. Network server 200 and computer 100 may be merged into the same system if computer system 100 has as one of its applications 122 a server software application in which case the network between the network server 200 and the computer 100 would be an internal communications bus.

Client system 300 is a device separate from computer 100 that can access legacy applications which reside and run on the computer 100. Client system 300 may be a personal computer system or a larger computer system such as a server, or a smaller computer system, such as notebook or laptop computer. Finally, client system 300 need not be a computer at all, but preferably is a simpler appliance-like client device with less memory such as a network terminal, a thin client, a terminal-like device, a voice response unit, etc. The convergence of computing, telecommunications and consumer electronics is causing a tremendous growth in the number and variety of pervasive mobile devices as clients 300. This mobile architecture enables the multitude of clients 300 including laptops, sub-notebooks, handheld computers, such as personal digital assistants and companion devices, and mobile appliances, such as smartphones, pagers, simple messaging devices and wearable devices. Thus when the client system 300 is a mobile device, a display adapter and network interface has a network user agent and supports a variety of multi-modal interfaces including traditional keyboard and mouse interfaces, small text screens, pen, touch screens, speech recognition, text-to-speech and other emerging technologies like wearable devices. A network user agent enables the use of the computer applications on its respective client 300. It is preferably intended that client system 300 include any electronic device which may interact with a network server 200 through the network user agent, such as a web browser, to access a legacy or other applications residing on the computer system 100. Such special-purpose devices for accessing the world wide web, such as an Internet access box for a television set, or a portable wireless web accessing device, which can implement a user agent for the purpose of invoking and executing an application are also intended to be within the scope of a client system 300. The network user agent could be implemented by control circuitry through the use of logic gate, programmable logic devices, or other hardware components in lieu of a processor-based system.

As will be described in detail below, aspects of the preferred embodiment pertain to specific method steps implementable on a computer 100 or a network server 200. In an alternative embodiment, the invention may be implemented as a computer program-product for use with either or both a network server 200 and a client 300. The programs defining the functions of the preferred embodiment can be delivered to the computer 100 and/or to the network server 200 via a variety of signal-bearing media, which include, but are not limited to: (a) information permanently stored on non-writable storage media, e.g., read only memory devices within either computer such as CD-ROM disks readable by CD-ROM drive 214; (b) alterable information stored on writeable storage media, e.g., floppy disks within diskette drive or hard-disk drive, such as shown as 214 in FIG. 2; or (c) information conveyed to a computer by a telephone or a cable media network, including wireless communications. Such signal-bearing media, when carrying computer-readable instructions that direct the functions of the present invention, represent alternative embodiments of the present invention.

Figure 3:
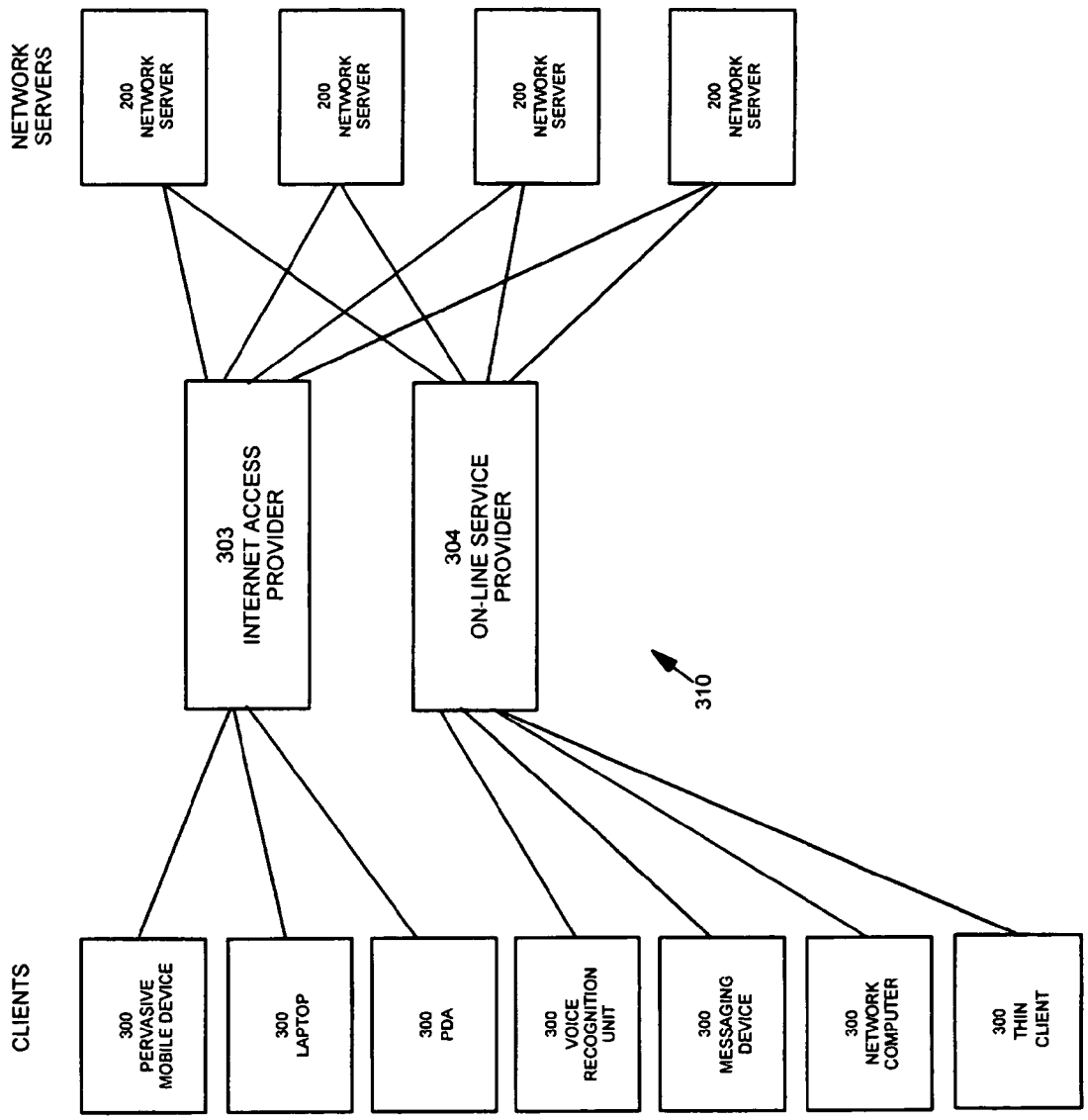
FIG. 3 is a simplified representation of a computer network of clients and servers capable of taking advantage of the preferred embodiment of the invention.

FIG. 3 is a simplified representation of a computer network 310. Computer network 310 is representative of the Internet, which can be described as a known computer network based on the client-server model discussed herein. Conceptually, the Internet includes a large network of network servers 200 that are accessible by client systems 300 through a private Internet access provider 303 or an on-line service provider 304. In the preferred embodiment, each of the client systems 300 may run a respective network user agent such as a browser to access network servers 200 via the access providers. Each network server 200 may have legacy applications of their own or may be connected to other computers 100 that have legacy applications to be accessed through the Internet or other connections to the clients 300. Moreover, a legacy application need not be stored on only one computer 100; rather various tasks of a single application may be stored on more than one computer 100 to which a network server 200 is connected through the network, such as the Internet. An Internet network path to servers 200 is identified by a Universal Resource Locator (URL) having a known syntax for defining a network connection. While various relatively direct paths are shown, it will be understood that FIG. 3 is a conceptual representation only, and that a computer network such as the Internet may in fact have a far more complex structure. It is also to be understood that computer network may also be an Intranet or other internal computer network, such as a WAN, a LAN, etc. The invention is particularly useful on the Internet in its preferred embodiment, although it is not intended to be so limited.

This embodiment of the invention is capable of converting user interface source code from display files to Internet or web-based graphical or other user interfaces, such as JavaServer Pages or other web pages. Even today, integrated computer servers such as the AS/400 from IBM maintain applications that were developed with a traditional 24X80 or 27X132 5250 user interface using a source language known as display file DDS (Data Description Specifications). This display file source code is compiled at development time into a display file object to which the application logic writes runtime data and from which the application logic reads user input. The display file source contains field descriptions of the constant unchanging portion of the screens whereas the dynamic portions are filled in at runtime by the application (output), or typed in by the user (input). The fields are partitioned into record formats for grouping purposes and the application logic writes and reads a record format at a time. When the application logic is writing data, data for all the output fields are supplied in a buffer. When the application logic is reading data, data entered by the user in all the input fields are returned in a buffer. Also returned is a feedback area buffer containing event information such as what function key was pressed.

In a particular embodiment of the invention described herein on the Internet and world wide web as the network, the platform-independent programming language is JAVA and the network or web pages are JavaServer Pages. One of skill in the art will recognize that other platform-independent programming languages and their respective web pages are easily encompassed by the description herein. Typically, in a Java application, the network pages dynamically insert application data into HTML or XML pages before the network pages are served to a network user agent, a process referred to as dynamically generated web content. Data to be used by the JavaServer Pages are stored in data objects, e.g., JavaBeans, that are populated by a servlet which has received data to publish. A very important feature of this embodiment of the invention is that once the legacy application display files have been converted to network pages, they become available for further manipulation and development.

This embodiment of the invention provides for the conversion of traditional display file source, such as DDS, to platform-independent source code, such as JavaServer Page source and JavaBean source, at development time. Development time simply means that a software developer is preparing a new user interface for an existing legacy application; development time is contrasted with runtime which refers actual execution of the application. In a brief overview, the static portions of the traditional display file source are first parsed to web-based language file and then the web-based language file is converted to web pages, such as JavaServer Pages, and the dynamic portions of the display file source become the objects to populate the web page, such as JavaBeans. In the instance given, there may be one JavaBean for the input buffer, one for the output buffer, and another for the feedback buffer. It is contemplated that the JavaServer Pages contain standard JavaServer Pages tags to extract the data from the output JavaBean and place it in the JavaServer Page at runtime. A servlet can be written to coordinate the JavaServer Page writing and reading. Once converted, and a servlet is written, the source can be rendered on a web browser using any web application server that supports the industry standard JavaServer Pages, or other web page format, and servlets. The original application logic can then be changed to write and read with the new Java Server Pages instead of the older display file objects which were created by compiling the display file source.

Figure 4:
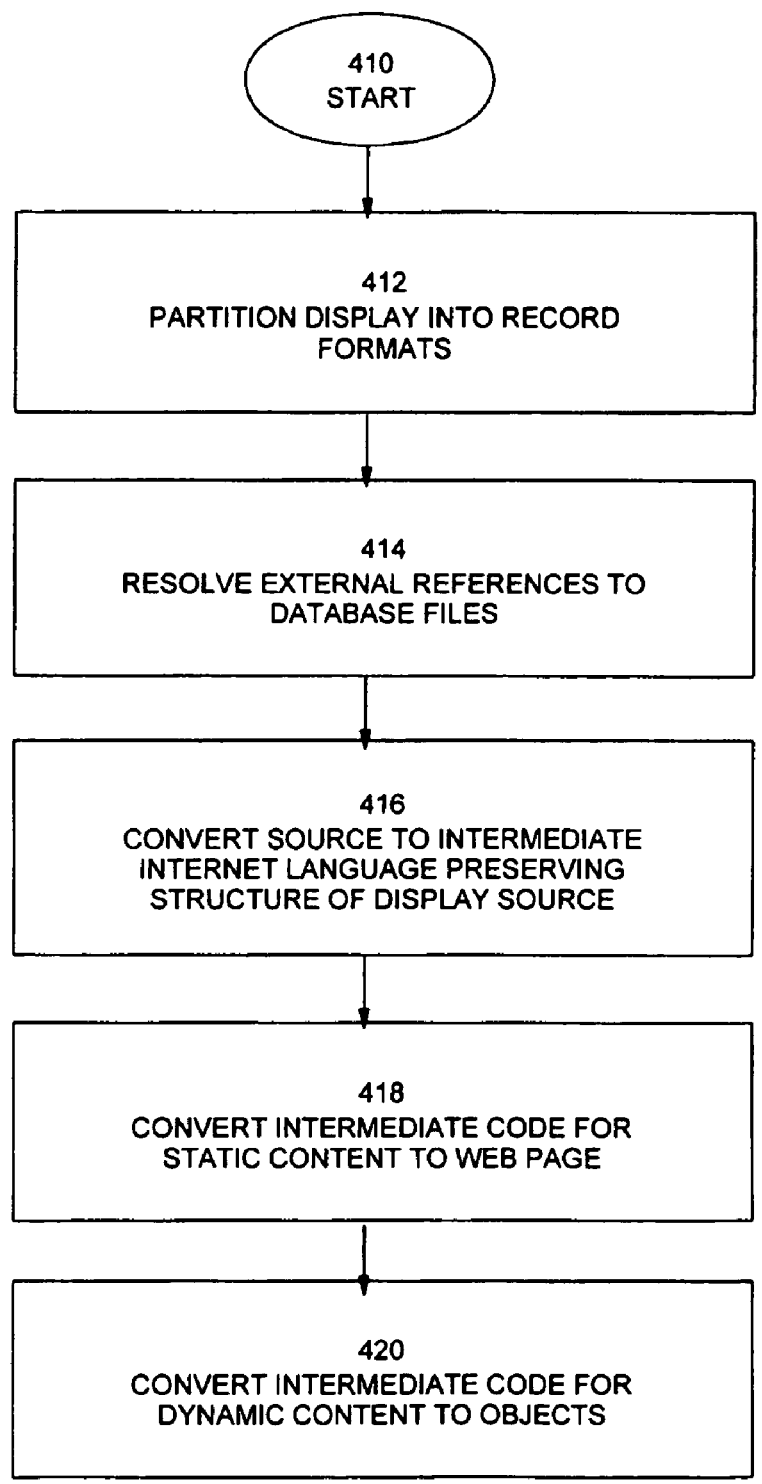
FIG. 4 is a simplified flow chart of a method by which display source of a legacy application may be converted to interactive network pages.

FIG. 4 is a simplified process diagram of a method in accordance with principles of an embodiment of the invention to convert legacy application display files to be used over a network, preferably the Internet using world wide web technology, although other networks and other technologies are considered to be within the scope of the invention. It is presumed that the user interface (UI) definitions of the native application user interface display screens are stored separately in screen definition files, although this need not be always the case. At start, step 410, and prior to runtime, the display source is parsed into record formats in step 412. A record format pertains to the source for a display or other interface which is written to or read from by the application logic at any one time.

More particularly, the display files source code are parsed into a normalized intermediate format that can be rendered by any pervasive computer Internet user agent such as a world wide web browser; this format preferably being based on XML, such as HTML, WML, or *ML, depending on the Internet user agent targeted to generate what is referred to as network pages. Contemplated within the scope of the disclosure herein is an ability to generate alternative outputs from the XML. JavaServer Pages and JavaBeans are generated by way of example only, it is equally feasible to generate Wireless Markup Language and data-describing XML to support hand-held devices and other personal digital assistants and user-interfaces other than graphical. In step 414, all the external references that can be made from display files are resolved to database files. This intermediate *ML format captures all of the resolved information enabling the information to be used subsequently without requiring any particular information or access about the computer or server upon which the legacy application resides. The conversion to the *ML format may be done either on the server upon which the application resides itself or on any remote systems such as other servers or other clients, including those with Windows-based operating systems in conjunction with a remote connection for retrieving the referenced information.

The display file source usually contains a hierarchy of constructs. First, there are file-level keywords that apply either to the display file overall, or to all the record formats and fields in the display file. The next level of constructs are record formats that contain record-level keywords, help areas, and fields. The record-level keywords apply either to the record format overall or all the fields in the record format. Then, there are help-areas that contain help-area keywords. And lastly, there may be fields that contain field-level keywords which may actually be field descriptions describing attributes about the field, either explicitly or by referencing another field in a database file. The parsing and conversion to a *ML file captures a superset of the information in the original display file source, using nested tags that mimic the structure of the display file source, as in step 416. For example, there is an outer level <file>tag, which contains nested <keyword>tags, <record>tags and <helparea>tags. The <record>tags contains nested <field>tags and <keyword>tags. The <helparea>and <field>tags contain nested <keyword>tags as well. Additional information captured may include any attributes that were resolved from external references to database fields.

The next step is the conversion code itself, which reads the intermediate *ML file and then converts the file representing static content to the web pages, e.g., JavaServer Pages, as in step 418. The intermediate *ML files of the dynamic buffers for the input/output/feedback data are then converted to objects, e.g., JavaBeans, as in step 420. In the preferred embodiment described herein, every record format from the original display file becomes a single JavaServer Page and three JavaBeans. The JavaServer Pages capture the static content of the record format such as text constant fields while the JavaBeans capture the dynamic data as described in the record format. There is one input JavaBean capturing all the input fields and their attributes for this record format. There is an output JavaBean bean capturing all the output fields and their attributes for this record format. There is yet a third JavaBean that provides feedback and is always the same and is used by a runtime to capture what the user did to return from the screen, e.g., press the Enter key button, or a function key button.

Preferably, when using Java as the Internet language, the code to read the intermediate XML file and from it produce the JavaServer Pages and JavaBeans is written in Java. The data field definitions of the JavaBeans have a one-to-one mapping with the variable data fields of HTML or XML pages housed by the JavaServer Pages and are generated during the conversion process as Java class definitions because the definition of the legacy application interfaces contain the I/O fields of the screens. Such mapping is known in the art, and there are other products such as Active Server Pages that are capable of providing dynamic content from a server to a client. In any embodiment, the servlet instance instantiates and populates these data objects with the redirected dynamic data, usually I/O data, of the legacy application. A further benefit of the using Java to implement the invention herein is the ability to do the conversion from *ML to Java on any operating system that supports Java, including the OS/400, WindowsNT, Linux, AIX, etc.

The use of an intermediate XML file and a Java-authored XML-JavaServer Page conversion algorithm, moreover, provides the ability to do the second step "offline" without any remote connection required to the server/computer upon which the legacy application resides. The XML information is complete.

The conversion tool as provided herein allows ready serviceability while it is running in production. If a problem arises, only the intermediate *ML file need be submitted to the conversion code development team instead of the original display file source and all the external database files referenced. This is convenient for the end users and the developers, and is less of a security concern to the end user who might not want to relinquish a confidential database.

Separating the two steps of the methodology of conversion, moreover, permits a developer to define and expose extension points that end users can use to extend or refine the conversion algorithm. For example, by exposing the Java interfaces used in the conversion algorithm, a developer could write Java code that offers an alternative implementation for a particular aspect of the conversion, producing additional or different JavaServer Page source. This enables an industry where software developers could build and sell extensions that generate better or industry-specific web pages. It might also be used by a company to generate embellish the generated JavaServer Pages with corporate logo banners, for example. Note that because the conversion is done at development time and the results are deployed at production time, the developer is free to finesse the generated output source prior to deployment into production.

Additionally, the creation of a legacy application datastream is avoided altogether, and instead the application's dynamic data is fed straight into the generated JavaServer Pages and directly rendered as web pages. Thus, at runtime, there is only one rendering of the datastream instead of two renderings. This, of course, achieves better performance of the web-based application at runtime.

Typically, the display file source contains more information than the legacy application data stream about the user interface. By converting the display file source at development rather than converting the application data stream during runtime, a better, more usable web page results. For example, the legacy application data stream may not include any information about which function keys are enabled for a particular record format. At runtime conversion, the resulting web page would have to have buttons for all twenty-four, more or less, function keys. With this approach of converting the display file source at development, a record format that only defines two function keys can be supported.

Without a doubt, source-to-source conversion refines the generated output. Users not happy with the resulting output have two choices to improve it: (a) edit the generated output source directly using any of the industry JavaServer Page editors such as IBM's WebSphere Studio; or (b) extend the conversion algorithm by writing Java code and offering alternative implementations for the specific construct, e.g., record or field or keyword being converted. The second alternative is easily enabled by offering published extension points in the algorithm in the form of non-final Java classes which can be extended and/or Java interfaces (alternative Java class implementations can be supplied). These extensions are easily achievable because Java is an open language that is easily accessible on any platform and because it is an object oriented language supporting refinement through inheritance and interfaces. By contrast, refining the converted output from the legacy application data stream at runtime is very tedious and difficult and is limited by the amount of information available in the data stream. To do this requires a tool to tell the runtime intercept how to identify the construct to be converted differently and then how to render or convert it to the alternative result. This usually results in runtime macros that are executed by the conversion code at runtime. On many thousands of screens this can be very time consuming and error prone. Further, it can further degrade the runtime performance as there is additional runtime overhead to find the user macros and run those macros, possibly for every record format in the legacy application datastream.

For existing legacy applications that are not frozen, i.e., their display file user interface is still evolving and changing at least occasionally, a source-to-source conversion, moreover, offers the ability to just maintain one source: the original display file data description specification. If it is changed to add a function to the original application, say, then the modified display file source need only be reconverted to JavaServer Page and JavaBean source again. Thus, both the display file user interface and the web user interface will be cohesive. By contrast, for legacy application data stream conversions during runtime, a change in the original display file requires finding all macros impacted by the change and then recreating or editing those macros. In this sense, there are two user interfaces to maintain.

Alternatively, the capability to convert traditional display source code to dynamic Internet-based web browser user interfaces can be used together with the IBM runtime intercept of Display File Input/Output as described by IBM Canadian patent 2,316,003 entitled Accessing Legacy Applications From the Internet by Satish Gungabeesoon, commonly owned by the assignee herein and incorporated by reference in its entirety. While this referenced patent teaches the runtime-intercept part of this overall architecture allowing legacy applications to run with a web browser user interface, features of the invention described herein are explicitly for the development-time conversion of the user interfaces. Preferably, great value is realized when the features described herein are used in conjunction with the runtime intercept, these features having substantial value in their own right for those looking to write their own runtime code and change their application to call their runtime. In this case, software developers would concentrate on development of the runtime, and are not burdened by the conversion of the user interface source because these features described herein automates the conversion in a development-time tool.

Thus, these embodiments of the invention allow the user to deploy entire business-critical legacy displays to the Internet to take advantage of state-of-the art technology and minimizing the restructuring and rewriting of the legacy application source code. These embodiments of the invention, moreover, allow the developer to extend the user interfaces and modify the network pages, such as JavaServer Pages, to create links within the network server to new web based applications. The solution presented herein further allows the I/O data to be converted to other formats that would suit display types other than a browser. One powerful application is the conversion of the I/O data and the display records to a generic XML based user interface. The XML-user interface can then be fed into different types of user interface renderers. These renderers can be Java-Swing based, Voice-Based, PDA Based, etc. The invention, therefore, opens access to existing legacy application from multiple types of future devices.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for converting display source code of a legacy application having mixed business and presentation logic on a server to a network interactive web-browser page, the method comprising:

resolving the display source code of the legacy application into a plurality of record formats, each record format corresponding to source code associated with an input/output screen of the legacy application;

parsing each record format into a corresponding intermediate file that is renderable by a web browser, each intermediate file including static content and dynamic content, the static content corresponding to an unchanging portion of a given input/output screen of the legacy application, the dynamic content corresponding to a dynamic portion of the given input/output screen that is filled in at runtime by the legacy application; and converting the static content of each intermediate file to a corresponding web page for display on the web browser including creating dynamic components for populating the web page based on the dynamic content of the intermediate file.

2. The method of claim 1, wherein each web page is displayed on the Internet.

3. The method of claim 2, wherein each web page is stored on the server.

4. The method of claim 1, wherein each web page is displayed on a network selected from the group consisting of: an internal network, an Intranet, a LAN, a WAN, an internal bus, a wireless network.

5. The method of claim 1, wherein each intermediate file is an XML language file.

6. The method of claim 5, wherein the XML language file is an HTML file.

7. The method of claim 5, wherein the XML language file is a WML file.

8. The method of claim 1, wherein each web page comprises a JavaServer Page.

9. The method of claim 1, wherein the dynamic components further comprise JavaBeans.

10. The method of claim 1, wherein each step of the method occurs at development time during which a user is preparing a new user interface for the legacy application.

11. The method of claim 10, wherein converting the static content of each intermediate file is performed offline without any remote connection to the server upon which the legacy application resides.

12. A computer readable medium containing program instructions tangibly stored thereon for creating web interfaces of a legacy application having mixed business and presentation logic stored on a computer, the program instructions for:

parsing display file data description source of the legacy application to render the display file data description source into a plurality of intermediate files that are each renderable by a web browser of a client, each intermediate file corresponding to a record format representing source code associated with an input/output screen of the legacy application;

converting each intermediate file to a corresponding web page, wherein at least one data object maintains input data, output data, and feedback data of the legacy application on the client, and at least one web page maintains static content of a given input/output screen of the legacy application;

dynamically updating the at least one web page with the input data, output data, and feedback data of the legacy application via a servlet instance; and displaying the dynamically updated web page through the web browser on a the client via a network.

13. The computer readable medium of claim 12, wherein:
the program instructions for parsing the display file data description source and converting each intermediate file are each executed during development time of the web-browser page; and the program instructions for dynamically updating the at least one web page and displaying the dynamically updated web page are each executed during runtime.

14. A computer readable medium containing program instructions tangibly stored thereon for use in a computer network, the computer readable medium containing program instructions for:

providing a plurality of intermediate files that are renderable by a web browser, each intermediate file corresponding to record format representing source code associated with an input/output screen of a legacy application, the legacy application having mixed business and presentation logic; and converting each intermediate file to a corresponding web page, a static portion of a given web page corresponding to a static portion of the corresponding record format and a dynamic portion of the given web page interacting with display input data, output data, and feedback data required by and from the legacy application.

15. A computer system for executing an application, comprising:

a central processing unit;

a main memory connected to the central processing unit with a communication bus;

a data storage unit connected to a data storage interface which is connected to the communication bus;

at least one input/output device connected to the communication bus and connected to a network interface to an external computer network, a legacy application having mixed business and presentation logic stored in the main memory and capable of executing on the central processing unit; and a plurality of intermediate files that are renderable by a web browser, each intermediate file corresponding to a record format representing source code associated with an input/output screen of the legacy application;

wherein as the legacy application executes, application logic uses either a legacy application display of associated with a given record format or the plurality of intermediate files for communication of the legacy application to a user over the external computer network.

16. A computer server for converting the display source of a legacy application having mixed business and presentation logic stored and executing on a computer, comprising:

a central processing unit;

a parser to parse the display source of the legacy application into a plurality of record formats, each of the record formats being unique to each input/output screen definition of the legacy application;

a generator of intermediate files having nested tags of each of the record formats, each intermediate file being renderable by a web browser,; and a converter operable to convert the intermediate files to one or more web pages, the converter further comprising:

an object creator to create dynamic components for dynamic portions of the record formats, the dynamic components for populating the one or more web pages; and a static component for display of unchanging aspects of the record formats, the static component representing the one or more web pages.

* * * * *